(12) United States Patent
Bapst et al.

(10) Patent No.: US 6,409,205 B1
(45) Date of Patent: Jun. 25, 2002

(54) INFANT CAR SEAT STROLLER

(75) Inventors: David M. Bapst, South Wales; Bryan Brown; Julia Favorito, both of Buffalo, all of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/422,070

(22) Filed: Oct. 21, 1999

(51) Int. Cl.$^7$ ................................................ B62B 7/06
(52) U.S. Cl. .................. 280/642; 280/648; 297/256.16
(58) Field of Search ................ 280/642, 647, 280/648, 650, 47.38, 87.051; 297/256.15, 256.16, 256.17

(56) References Cited

U.S. PATENT DOCUMENTS

| | | |
|---|---|---|
| 879,907 A | 2/1908 | Riffo |
| 2,335,484 A | 11/1943 | Chrisman |
| 2,506,601 A | 5/1950 | Kelch, Jr. |
| 2,670,216 A | 2/1954 | Leonard |
| 2,678,219 A | 5/1954 | Goodman |
| 2,783,053 A | 2/1957 | Sheldrick et al. |
| 2,805,076 A | 9/1957 | Thomas |
| 2,873,123 A | 2/1959 | Eppinger |
| 3,000,646 A | 9/1961 | Kummeth, Sr. |
| 3,459,435 A | 8/1969 | Garner |
| 3,504,926 A | 4/1970 | Gläser |
| 3,556,546 A | 1/1971 | Garner |
| 3,689,099 A | 9/1972 | Patterson |
| 3,796,439 A | 3/1974 | Perego |
| 3,797,848 A | 3/1974 | Burnham |
| 3,799,567 A | 3/1974 | Toda |
| 3,847,406 A | 11/1974 | Burnham |
| 3,953,046 A | 4/1976 | Johansson |
| 4,042,249 A | 8/1977 | Kassai |
| 4,126,331 A | 11/1978 | Sloan et al. |
| 4,191,397 A | 3/1980 | Kassai |
| 4,216,974 A | 8/1980 | Kassai |

(List continued on next page.)

FOREIGN PATENT DOCUMENTS

| | | | | |
|---|---|---|---|---|
| EP | 258826 | * | 3/1988 | .................. 280/642 |
| EP | 483042 | * | 4/1992 | .................. 280/650 |
| EP | 483 042 | | 4/1992 | |
| FR | 2603240 | * | 3/1988 | .................. 280/642 |
| GB | 2 251 830 | | 7/1992 | |
| JP | 4-154477 | * | 5/1992 | .................. 280/642 |
| WO | WO98/12094 | | 3/1998 | |

*Primary Examiner*—Frank Vanaman

(57) ABSTRACT

A Child's stroller including a latch mechanism for convenient folding and unfolding of the stroller, a bolster/tray that pivotally mounts to the upper handlebars of the stroller and is adapted for receiving an infant carrier or car seat for convenient transport of an infant passenger thereof in the stroller. The latch mechanism utilizes a latching handle that pivotally engages a spring loaded collar for disengagement of the stroller frame.

23 Claims, 15 Drawing Sheets

U.S. PATENT DOCUMENTS

| | | | |
|---|---|---|---|
| 4,317,581 A | 3/1982 | Kassai | |
| 4,324,410 A | 4/1982 | Perego | |
| 4,362,315 A | 12/1982 | Kassai | |
| 4,369,986 A | 1/1983 | De La Fé | |
| 4,412,688 A | 11/1983 | Giordani | |
| 4,415,180 A | 11/1983 | Payne, Jr. | |
| RE31,760 E | 12/1984 | Kassai | |
| 4,529,219 A | 7/1985 | Shamie | |
| 4,542,915 A | 9/1985 | Wheeler, III et al. | |
| 4,544,178 A | 10/1985 | Al-Sheikh et al. | |
| 4,591,176 A | 5/1986 | Kassai | |
| 4,616,844 A | 10/1986 | Kassai | |
| 4,660,850 A | 4/1987 | Nakao et al. | |
| 4,681,340 A | 7/1987 | Pasquini | |
| 4,685,688 A | 8/1987 | Edwards | |
| 4,697,823 A | 10/1987 | Kassai | |
| 4,819,958 A | 4/1989 | Perego | |
| 4,836,573 A | 6/1989 | Gebhard | |
| 4,844,504 A | 7/1989 | Bigo | |
| 4,848,787 A | 7/1989 | Kassai | |
| 4,993,743 A | 2/1991 | Takahashi et al. | |
| 5,056,865 A * | 10/1991 | Sedlack | 297/256.17 |
| 5,074,575 A | 12/1991 | Bigo | |
| 5,104,180 A | 4/1992 | Takahashi et al. | |
| 5,181,735 A | 1/1993 | Onishi | |
| 5,197,753 A | 3/1993 | Liu | |
| 5,201,535 A | 4/1993 | Kato et al. | |
| 5,205,577 A | 4/1993 | Liu | |
| 5,205,579 A | 4/1993 | Kato et al. | |
| 5,226,658 A | 7/1993 | Huang | |
| 5,244,228 A | 9/1993 | Chiu | |
| 5,257,799 A | 11/1993 | Cone et al. | |
| 5,370,572 A | 12/1994 | Lee | |
| 5,388,853 A | 2/1995 | Lauro | |
| 5,427,402 A | 6/1995 | Huang et al. | |
| 5,447,323 A | 9/1995 | Huang | |
| 5,454,584 A | 10/1995 | Haut et al. | |
| 5,460,398 A | 10/1995 | Huang | |
| 5,472,224 A | 12/1995 | Cabagnero | |
| 5,478,102 A | 12/1995 | Haung | |
| 5,482,311 A | 1/1996 | Huang | |
| 5,499,831 A | 3/1996 | Worth et al. | |
| 5,513,864 A | 5/1996 | Huang | |
| 5,535,483 A | 7/1996 | Cabagnero | |
| 5,536,033 A | 7/1996 | Hinkston | |
| 5,605,409 A | 2/1997 | Haut et al. | |
| 5,622,377 A | 4/1997 | Shamie | |
| 5,634,645 A | 6/1997 | Lin | |
| 5,645,293 A | 7/1997 | Cheng | |
| 5,662,378 A * | 9/1997 | Carruth | 297/256.15 |
| 5,676,386 A * | 10/1997 | Huang | 280/650 |
| 5,687,984 A | 11/1997 | Samuel | |
| 5,695,212 A | 12/1997 | Hinkston | |
| 5,718,444 A | 2/1998 | Huang | |
| 5,725,238 A | 3/1998 | Huang | |
| 5,727,798 A | 3/1998 | Walters et al. | |
| 5,743,671 A | 4/1998 | Williams | |
| 5,755,455 A | 5/1998 | Chen et al. | |
| 5,769,447 A | 6/1998 | Huang | |
| 5,775,718 A | 7/1998 | Huang | |
| 5,845,924 A | 12/1998 | Huang | |
| 5,855,384 A | 1/1999 | Pike et al. | |
| 5,865,460 A | 2/1999 | Huang | |
| 5,882,030 A * | 3/1999 | Haut | 280/642 |
| 6,068,285 A * | 5/2000 | Jackson et al. | 280/650 |
| 6,070,890 A * | 6/2000 | Haut et al. | 280/47.38 |

* cited by examiner

INFANT CAR SEAT STROLLER

FIELD OF INVENTION

The present invention relates to a child's stroller and more particularly to a child's stroller having a convenient frame latch mechanism and pivoting bolster member with activity tray operative for transporting an infant carrier/car seat in the stroller.

BACKGROUND OF INVENTION

Stroller Frame Related Art

Child stroller frames that are configurable between folded and deployed positions by manual activation of a frame latching device are well known. One type of foldable, four-wheel stroller frame has a pair of front legs coupled to the stroller handlebar through a latching device operative for locking the handlebar and front leg in a parallel relation when the stroller is in a deployed or use configuration, and a pair of rear legs rotationally coupled to either the front legs or handlebar. One example of this variety of stroller is found in U.S. Pat. No. 5,388,853. Latching mechanisms for stroller frames are usually designed with a view towards providing users with a convenient means for folding and unfolding a stroller while at the same time providing a reliable locking mechanism which reduces the possibility that the stroller frame will collapse during use by sudden disengagement of the latching mechanism.

There are a wide variety of latch mechanisms known in the art. One such latch is described in U.S. Pat. No. 5,605,409 (Haut). Haut describes a latch consisting of a first leg rotationally coupled to a first arm of a stroller frame through a body member with a spring-biased locking device being provided on the first arm for locking the first leg and first arm in a parallel relationship when the stroller is in an operating position. The locking device consists of a catch movable against a compressed spring to allow the first leg to be rotated relative to the first arm when configuring the stroller in a collapsed configuration. To fold the stroller, the catch is manually pulled upwards against the spring force to allow a user to then rotate the first arm downwards. Haut's latching device is disadvantageous since the first arm (which corresponds to the stroller handle bar) must be simultaneously rotated while the user is holding the catch open, often times from the rather awkward rearward stroller position (i.e., rearward of the handle bar), thereby requiring the user to lift up on the stroller and/or reach over the handlebar to begin the folding sequence. It would be preferable if the latching device were such as to allow a user to release the latch and fold the stroller in one simple motion from a convenient position.

Another example of a stroller latch device requiring a two-step folding sequence is found in U.S. Pat. No. 5,388,853 (Lauro). Lauro's locking member includes a sleeve coaxial with a second tube for rotatably and slidably mounting the locking member on the second tube. The locking member is rotated around the second tube so that a receptacle portion of the locking member may be brought into engagement with the first tube to lock the first and second tubes in a parallel relation. Lauro suffers from the same drawback of requiring the user to first unlock the latch and then fold the stroller. Lauro suffers from the additional drawback of not providing a latch which self-locks as the stroller is deployed in a use configuration. The self-locking feature is important as it reduces the possibility that a child will be placed in the stroller before properly engaging the latch.

Still another variety of a stroller latch is found in U.S. Pat. No. 5,427,402 (Huang '402) and U.S. Pat. No. 5,460,398 (Huang '398). Huang '398 describes a latch consisting of a positioning means secured to a front member and pivotally coupled to a lower end of the stroller handlebar and a retainer means fixed to the handlebar and including a retainer member adapted for engagement with a spring-loaded sliding hook member mounted to the positioning member. To disengage the latch, a button operative for displacing the sliding hook member is depressed to release the retainer member, thereby allowing the handle to be rotated relative to the front member. Huang '402 describes a similar latch approach providing a spring loaded button for releasably fixing a positioning and retaining seat in a locked configuration. The latches described in Huang '398 and Huang '402 are undesirable due to the complexity of the button engagement mechanisms. It would be preferable if the number of moving parts in the stroller latch were reduced and/or if the mechanism for locking and unlocking the stroller were simplified to promote durability of the latch and reduce costs associated with manufacture of the latch. Huang '398 and Huang '402 also do not satisfactorily address the need for providing a more convenient means for folding and unfolding a stroller.

In light of the drawbacks and limitations described and shown in existing stroller latches, there is a need for a stroller latch which provides a more convenient means folding and unfolding a stroller. In particular, the known stroller latches suffer from one or more of the following drawbacks: the stroller folding sequence requires a two step process (either carried on simultaneously or as separate steps) of first disengaging a latch and then folding the stroller; the latch device is unnecessarily complicated, involving an excessive number of moving parts; or the latch operation and folding of the stroller is unnecessarily complicated.

Infant Carrier/Stroller System and Stroller Tray Related Art

It has been found to be very convenient for parents to be able to transport infants to and from strollers by providing a mounting device on the stroller for securing handheld infant carriers and/or infant car seats directly to the stroller frame. By providing a means for mounting the infant carrier/car seat to the stroller, the parent can more easily transport the infant from one place to another and a resting infant will not be as disturbed during travel. It has also been found desirable to provide a stroller safety bar or front tray section for a child seated in a stroller.

One example of a stroller which is operative for mounting an infant carrier is described in U.S. Pat. No. 5,727,798 (Walters). Walters' stroller includes a U-shaped safety bar having free ends coupled to the lower tubes of the frame. The U-shaped safety bar includes a recess at its center for releasably receiving an infant carrier having an operator controlled latch and recesses formed in the infant carrier shell for receiving the safety bar. Walters approach for mounting the infant carrier is undesirable in that the U-shaped bar coupled to the lower tube is limited to fixed bars disposed across the seating area. It would be preferred if an infant carrier mount could be provided that is re-positionable for removal/placement of a child in the stroller seat, functions as an activity tray, and which allows a toddler to climb in and out of the stroller seat without being obstructed by the infant carrier mount or activity tray.

Another approach for mounting an infant carrier to a stroller is found in the "Infant Safety Seat/Carrier and Travel System" by Graco Children's Products, Inc. (Graco). Graco is similar to Walters with the exception that Graco's infant t carrier mounts to a removable tray disposed across the stroller seating area, rather than the U-shaped safety bar as in Walters. Graco describes an infant carrier/stroller combination in which the infant carrier mount to the stroller also serves as a tray that may be selectively removed or pivoted away from the seating area. The Graco tray includes a center recess where the infant carrier is latched (as in Walters) and a pair of ends having flexible collars for gripping the upper ends of the left and right front leg tubes. The tray may be pivoted about one of the right and left leg tubes by prying a collar to allow the tray to be pivoted about the other leg tube (the tray may also be completely removed by prying open both left and right collars). Graco's stroller tray/infant carrier mounting scheme is undesirable because care must be used to insure that the left and right collars are secured to the leg tubes before the infant carrier is mounted and the tray must be completely removed if a parent does not wish to have a tray disposed across the seating area during use. It would be preferred if a tray that also serves as an infant carrier mount were available which reduced the possibility that the infant carrier would be mounted on the tray which was not safely secured to the stroller frame and which also could be conveniently relocated on the stroller without having to completely remove the tray from the stroller.

In light of the drawbacks and limitations described and shown in existing infant carrier/stroller systems, there is a need for a stroller operative for mounting an infant carrier which overcomes the drawbacks and limitations of the existing art. In particular, the known stroller/infant carrier mounting approaches suffer from one or more of the following drawbacks: the infant carrier is mounted to a fixed bar extending across the seating area; or the stroller provides a infant carrier mount/tray which is not easily re-positionable on the stroller to accommodate different uses.

SUMMARY OF INVENTION

The invention satisfies the above identified needs in stroller latches while avoiding the problems and disadvantages of the existing art by providing a convenient latching mechanism that is self locking and which is disengaged to fold the stroller by pivoting latch handles to simultaneously disengage the latch and fold the stroller frame. The invention also satisfies the above identified needs in infant carrier/stroller systems while avoiding the problems and disadvantages of the existing art by providing a stroller bolster having a tray area and child carrier mount for mounting a child carrier, the bolster being rotationally coupled to the upper ends of the stroller handlebar for convenient repositioning of the stroller tray area and child carrier mount by pivoting the bolster between a stowed position and a use position whereby the bolster tray and child carrier mount are placed across the stroller seating area. By providing a re-positionable bolster pivotally coupled to the stroller handlebar, the stroller provides convenient removal/placement of a child in the stroller, allows a child to climb in and out of the stroller without being obstructed by the tray or child carrier mount, and allows the bolster to be pivoted between the use and stowed positions while children of varying seated heights are seated in the stroller.

In one aspect of the invention, a stroller latch for selectively configuring a stroller frame between a folded and unfolded positions includes a latch mount pivotally mounted to the lower end of a stroller handle and fixedly mounted to the upper end of the stroller front leg, a collar slidably coupled to the stroller handle, the collar including a locking sleeve releasably engageable over the upper end of the front leg to lock the front leg and stroller handle in a deployed position, and a latch handle pivotally coupled to the latch mount and operative for releasing the locking sleeve from the upper end of the front leg and configuring the stroller in the folded position by pivoting the latch handle into mating engagement with the collar. Preferably, the locking sleeve is released by rolling surface contact between a first engagement surface of the collar and a second engagement surface of the latch handle to impart upward motion for releasing the locking sleeve. The latch handle preferably includes a downwardly extending hand grip to enable a user facing the rear of the stroller frame to fold the stroller by lifting up on the hand grip, thereby rotating the latch handle to configure the stroller in the folded position.

In another aspect of the invention, there is provided a stroller frame including a stroller handle, rear leg and front leg, the stroller handle being pivotal about a rotation axis and the stroller being folded by rotating the stroller handle in a stroller folding direction. A first latch member is slidable along the lower end of the stroller handle, the first latch member including a locking sleeve received over the upper end of the front leg, thereby locking the stroller frame in the deployed position, and a second latch member is pivotally coupled to the front leg hinge for pivotal motion about the axis of rotation. In this aspect of the invention, the stroller frame is configured from the deployed to the folded position by pivoting the second latch member in the stroller folding direction.

In still another aspect of the invention, a stroller latch is adapted for selectively configuring a stroller frame between a folded and unfolded position, the stroller frame including a stroller handle having a lower end, front leg having an upper end and a rear leg hingedly coupled to the stroller handle through a rear leg hinge. In this aspect of the invention, the stroller latch includes a latch mount pivotally mounted to the lower end of the stroller handle and fixedly mounted to the upper end of the front leg, a locking member coupled to the stroller handle, the locking member being releasably engageable with the upper end of the front leg to configure the stroller frame in the unfolded position, an engaging surface formed on the locking member, and a cam defining a camming surface disposed in operative proximity to the engaging surface, the cam being pivotally coupled to the latch mount and operable for configuring the stroller in the folded position by pivoting the camming surface into mating engagement with the engaging surface.

In still another aspect of the invention, a stroller adapted for mounting an infant carrier or car seat is provided. The stroller includes a stroller bolster having left and right terminal ends pivotally coupled to said stroller handle at the left and right intermediate ends thereof and a center section positionable between a first position wherein the center section is positioned across the seating area and a second position wherein the center section is positioned adjacent the stroller handle upper end. The center portion includes a child activity area including left and right end portions and a center portion extending between and forward of the left and right end portions, a child carrier mount for mounting a child carrier, the child carrier mount including left and right mounting members disposed rearward of the center portion and extending inward from the respective left and right end portions, wherein the left and right mounting members are adapted for receiving corresponding latching hooks of an infant carrier.

DETAILED DESCRIPTION OF THE PREFERRED EMBODIMENTS

Reference will now be made to the presently preferred embodiment of the invention, examples of which are illustrated in the appended drawings and the following detailed description.

Figure 1:
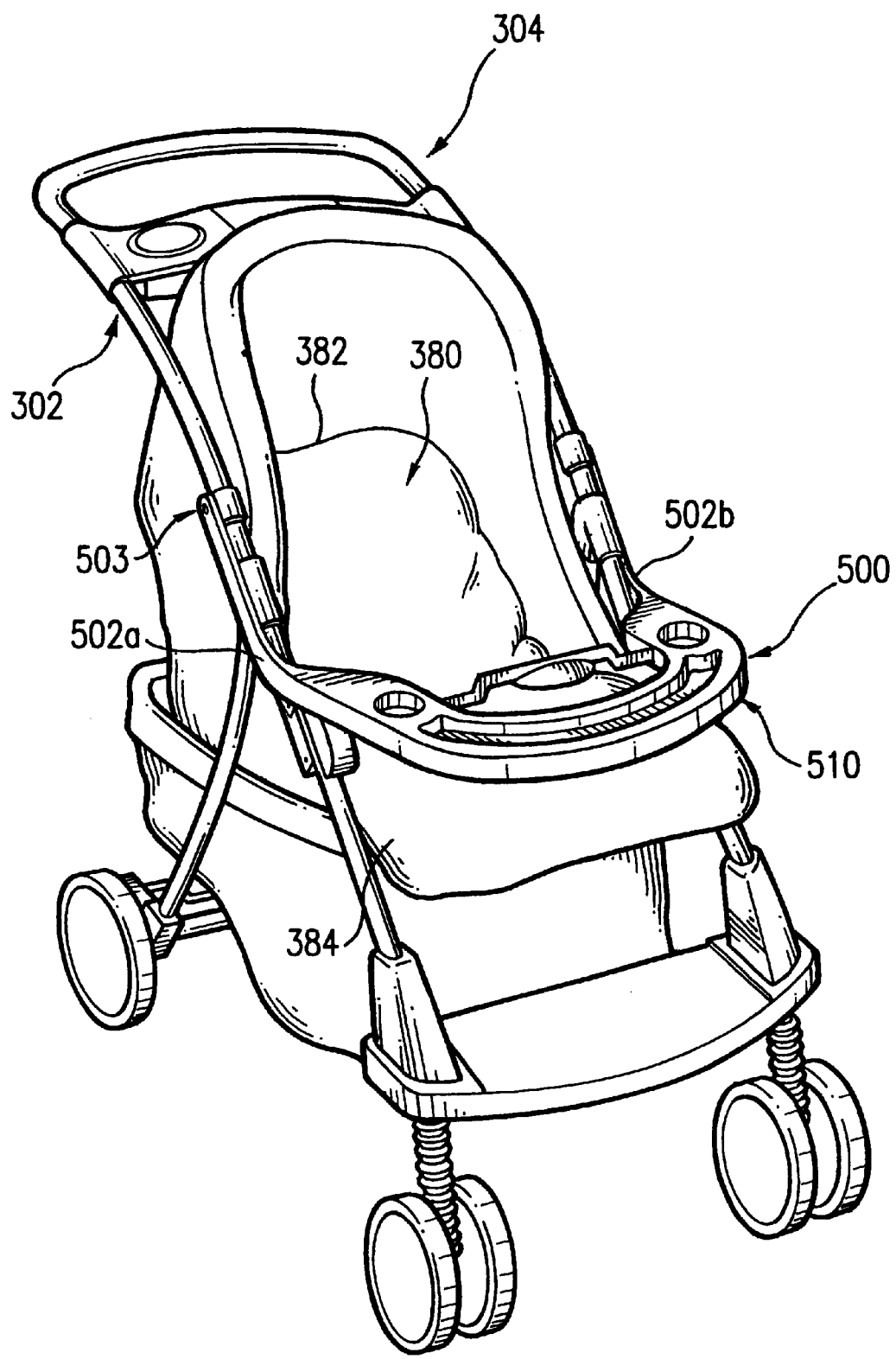
FIG. 1 is an isometric view of a stroller.
Figure 2:
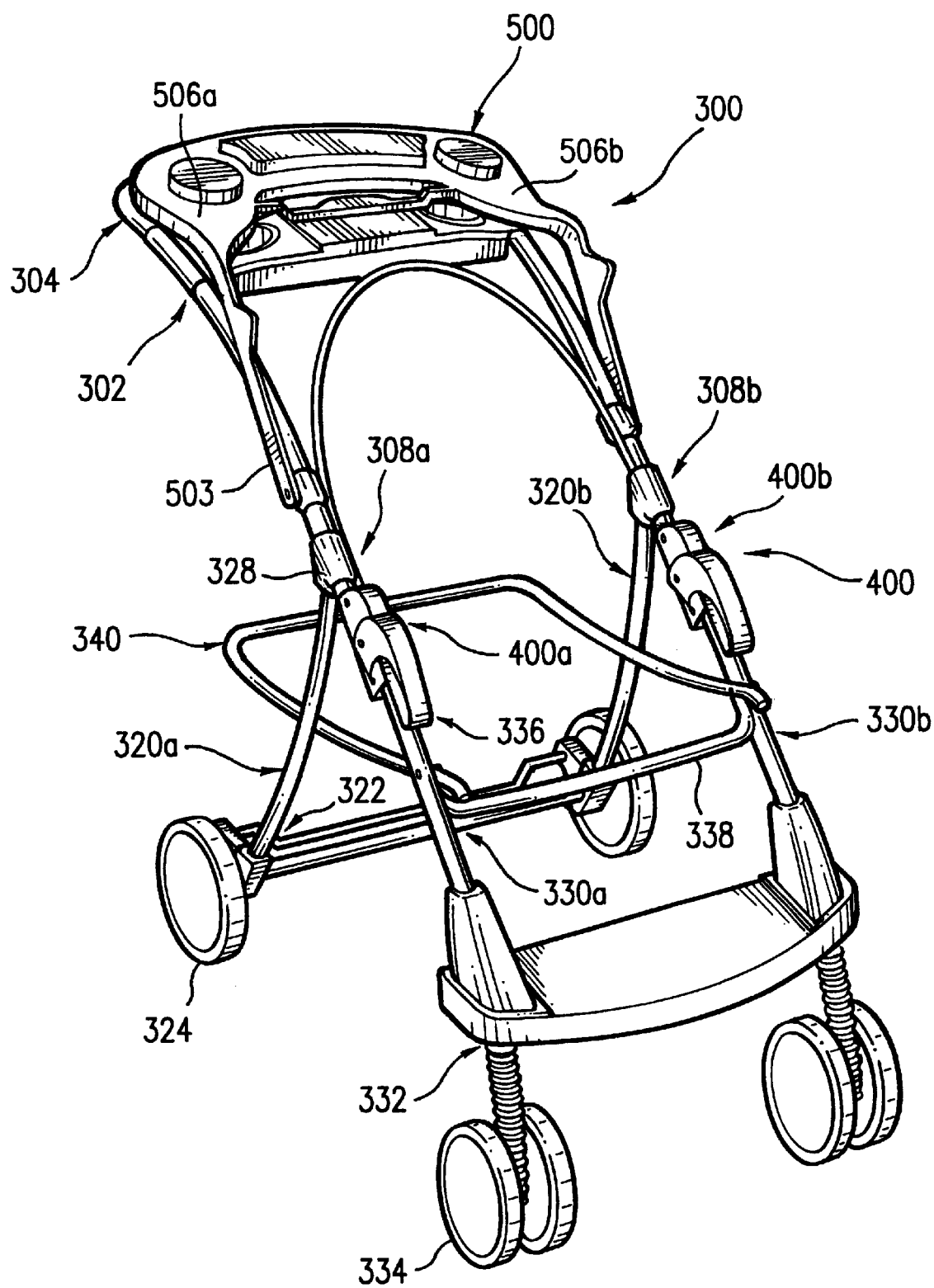
FIG. 2 is an isometric view of the stroller of FIG. 1 with soft goods removed.
Figure 10:
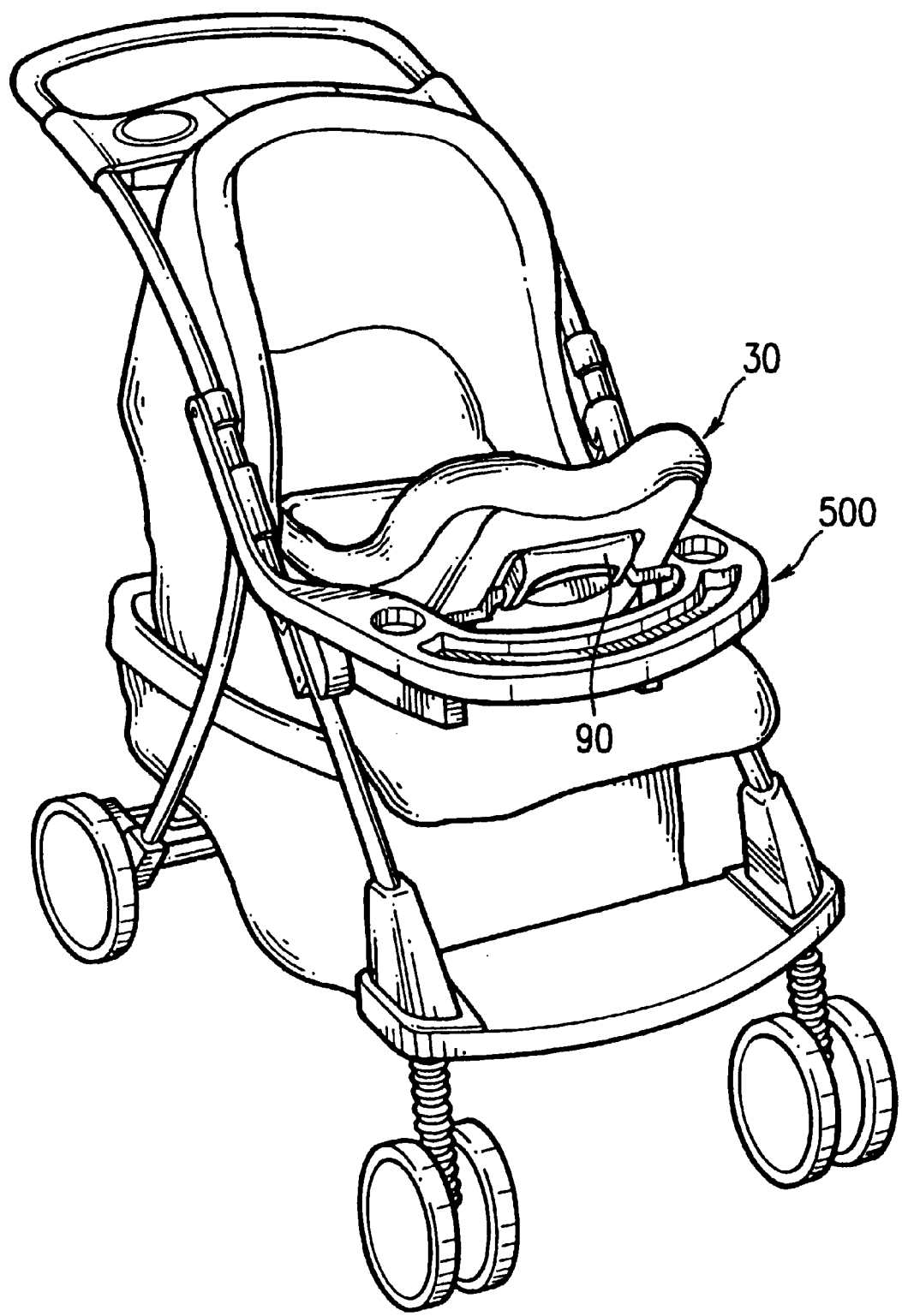
FIGS. 10 and 11 are isometric and exploded isometric views of the stroller of FIG. 1 and the infant carrier of FIG. 9A.
Figure 11:
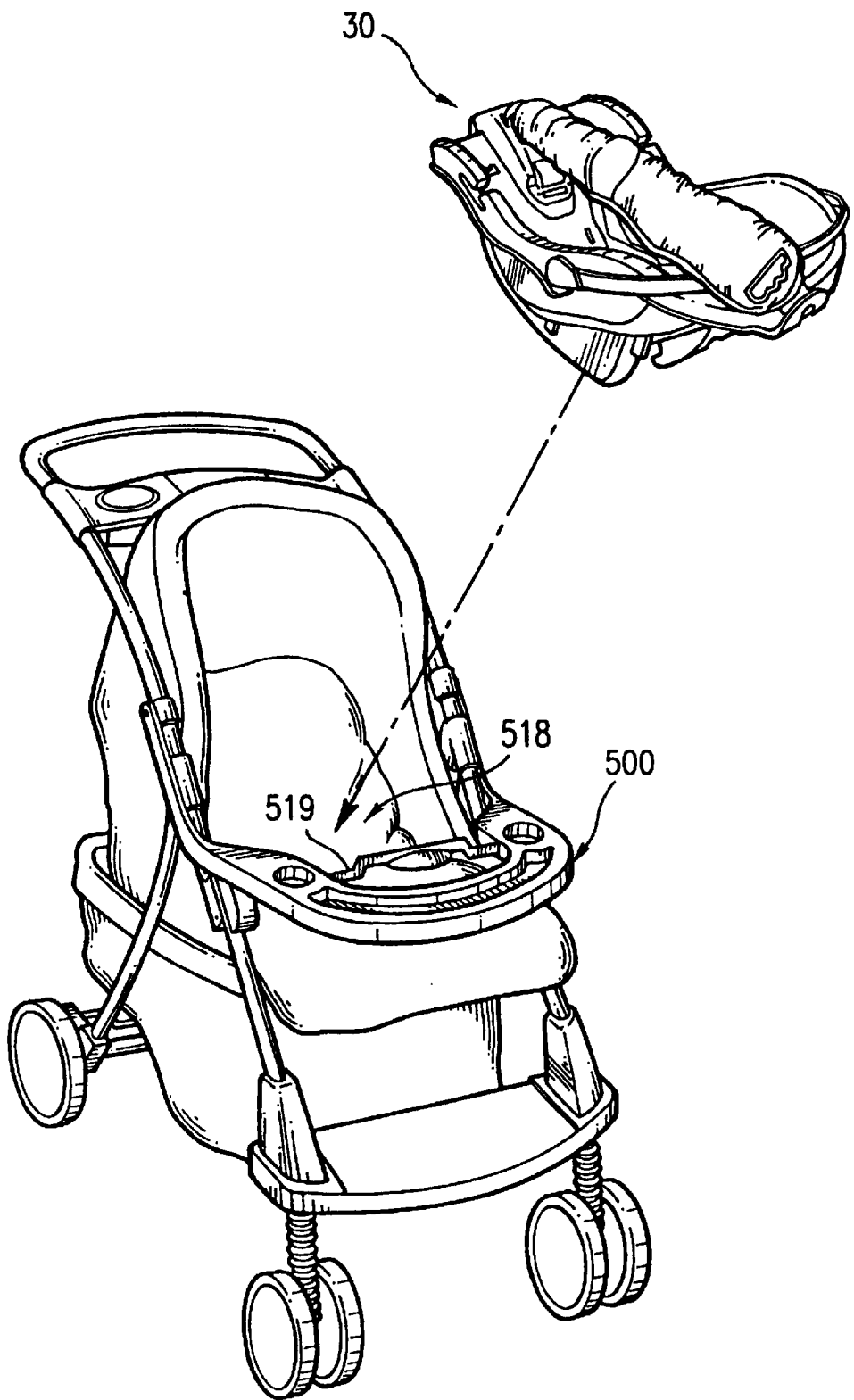

Referring to FIGS. 1 and 2, the preferred embodiment of the stroller incorporating the principles of invention includes a stroller frame 300 configurable between deployed and collapsed positions by manual operation of a right and left frame latch 400a, 400b, soft goods secured to frame 300 which form a seating area 380 for a child occupant and a bolster 500 pivotally mounted to frame 300 and positionable across seating area 380 (FIG. 1) or adjacent to an upper end 304 of stroller handle 302 (stowed position, FIG. 2). Seating area 380 includes an adjustable backrest 382 and seat 384. Referring briefly to FIG. 10, the stroller is adapted for mounting an infant carrier 30 on bolster 500 so as to enable safe transport of a young child in the stroller without removing the child from infant carrier 30.

Stroller Frame and Latch

Figure 3:
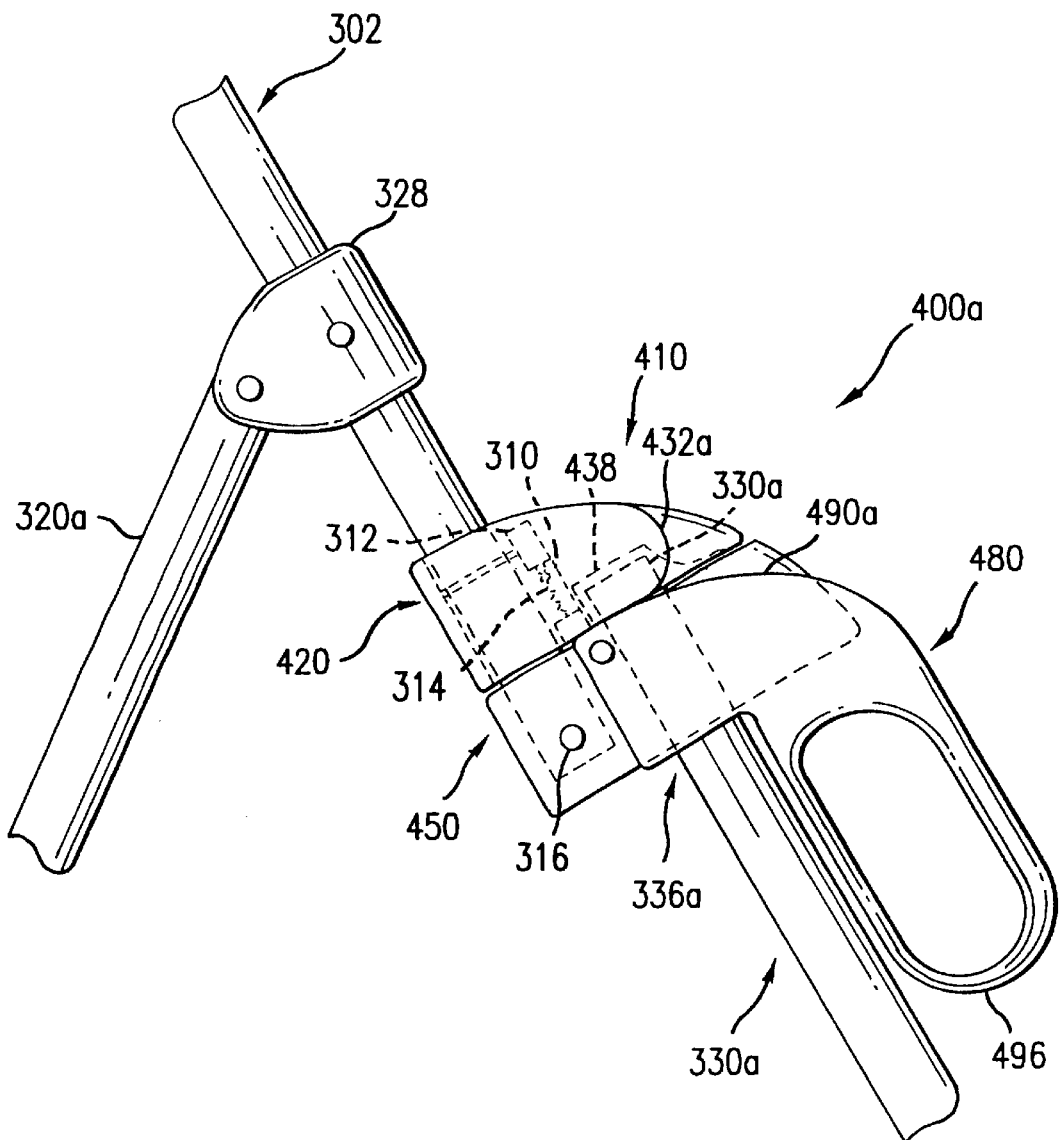
FIG. 3 is a side view of the latch of the stroller of FIG. 2.

Reference will now be made in detail to stroller frame 300 and latch 400. As shown in FIG. 2, frame 300 includes a U-shaped handle 302 having an upper end 304 and left and right downwardly extending terminal ends 308a, 308b, a pair of left and right rear legs 320a, 320b each having a lower end 322 mounting a stroller wheel 324 and an upper end 326 pivotally coupled to handle 302 through a rear leg hinge 328 (as best seen in FIG. 3), a pair of left and right front legs 330a, 330b each having a lower end 332 mounting a stroller wheel 334 and an upper end 336 coupled to handle 302 through latch 400 (as best seen in FIG. 3), a frame brace 338 extending between and fixedly connected to left and right front legs 330a, 330b and U-shaped pivot member 340 extending between and pivotally connecting left and right front legs 330a, 330b to left and right rear legs 320a, 320b. Handle 302, rear legs 320a and 320b, front legs 330a and 330b, first frame brace 338 and pivot member 340 are preferably made from hollow metal tubing.

Left and right latches 400a, 400b are preferably of the same construction and operate in the same manner. Therefore, only left latch 400a will be described in detail with the understanding that the same description applies equally to right latch 400b. Latches 400a, 400b are preferably made from molded plastic.

Figure 4A:
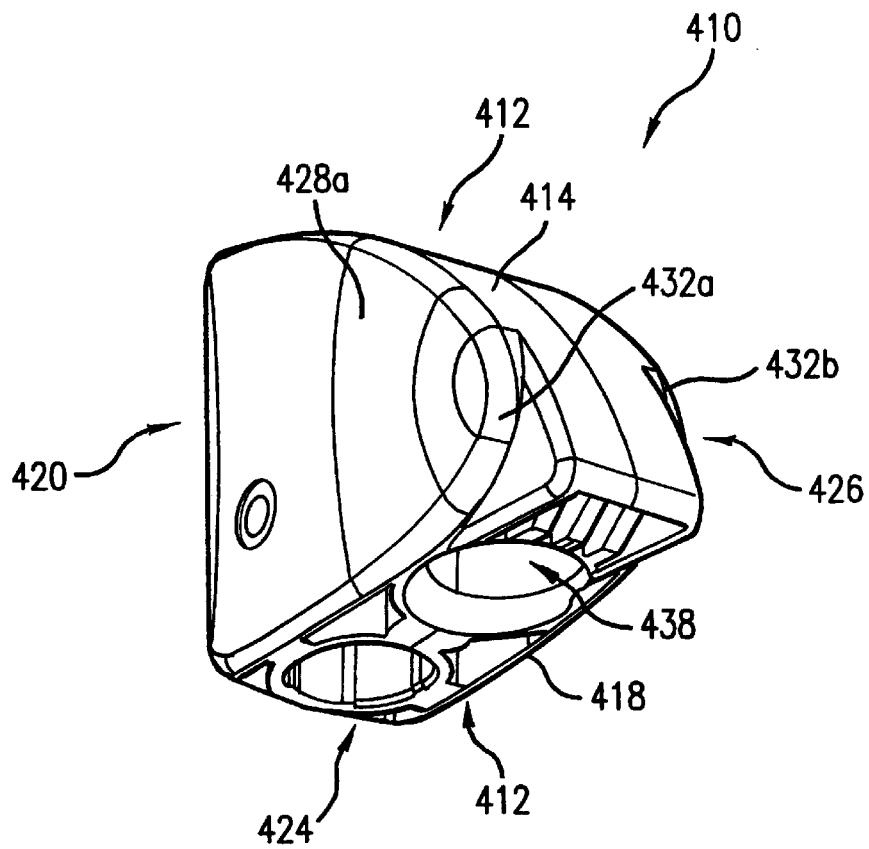
FIGS. 4A and 4B are isometric views of the collar of the stroller latch of FIG. 3.
Figure 4B:
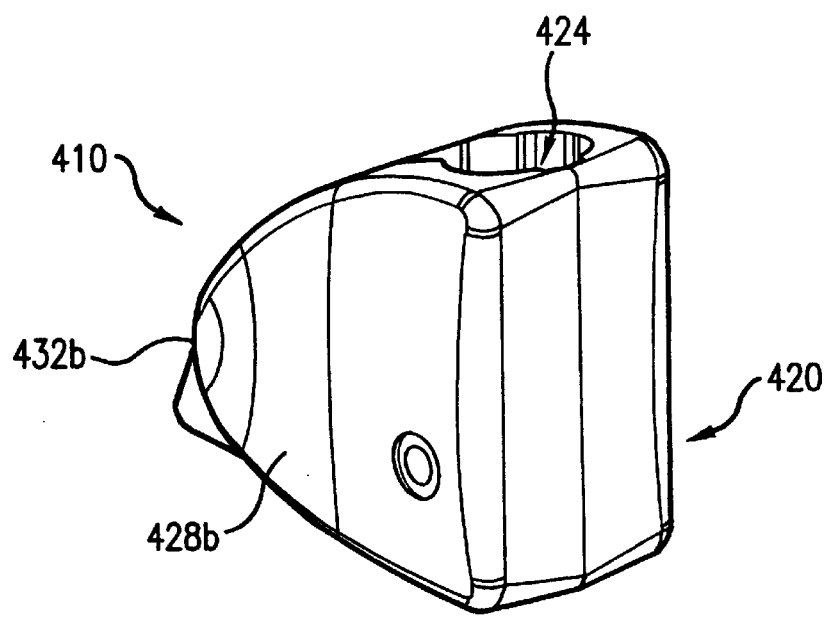

Referring to FIGS. 3, 4a, 4b, 5, 6a and 6b, latch 400a includes a collar 410, a latch mount 450 and a latch handle 480, each of which are preferably formed from molded plastic. Referring to FIGS. 3, 4a–4b, collar 410 includes a top end 412 having a generally forward sloping surface 414, bottom end 416 defining a planar mating surface 418 with latch mount 450 and a rearward end 420 defining a cavity 424 extending from top end 412 to bottom end 416, the inner wall spacing of which being sized to allow collar 410 to freely slide along the longitudinal axis of stroller handle 302 upon insertion of terminal end 308a into cavity 424. Referring to FIG. 3, collar 410 is preferably spring biased towards latch mount 450 to ensure that locking sleeve 438 (discussed below) does not release from top portion 337 of front leg 330a during use and to provide a self-locking feature when configuring stroller frame 300 from folded to deployed positions, as discussed later. The spring biasing mechanism for collar 410 is constructed as follows: a longitudinal slot or channel 310 is formed in collar 410 to permit travel of block 312 (which is secured to handle 302 by a rivet) within longitudinal channel 310 as collar 410 is moved along stroller handle 302. A compression spring 314 (i.e., a spring that resists outward extension of its ends) is then secured at one end to collar 410 and at the other end to block 312. Thus, any upwards motion of collar 410 along handle 302 is resisted by spring 314.

Referring to FIG. 4b, a locking sleeve 438 is formed near forward end 426 and is sized to receive a top portion 337 of front leg upper end 336. When top portion 337 is received in locking sleeve 438, front leg 330a is prevented from rotating relative to stroller handle 302, thereby locking stroller frame 300 in the deployed position, FIG. 3. Locking sleeve 438 extends upward from bottom end 416 a sufficient height so as to fully capture top portion 337 and bring collar planar mating surface 418 into mating contact with latch mount 450 mating surface 454. Formed on the left side 428a (FIG. 4a) and right side 428b (FIG. 4b) of collar 410, near forward end 426, are left and right first engagement surfaces 432a, 432b positioned for engagement with corresponding left and right second engagement surfaces 490a, 490b of latch handle 480 when latch handle 480 is pivoted upwards to disengage latch 400a and configure stroller frame 300 in the folded position, as discussed in greater detail below.

Figure 6A:
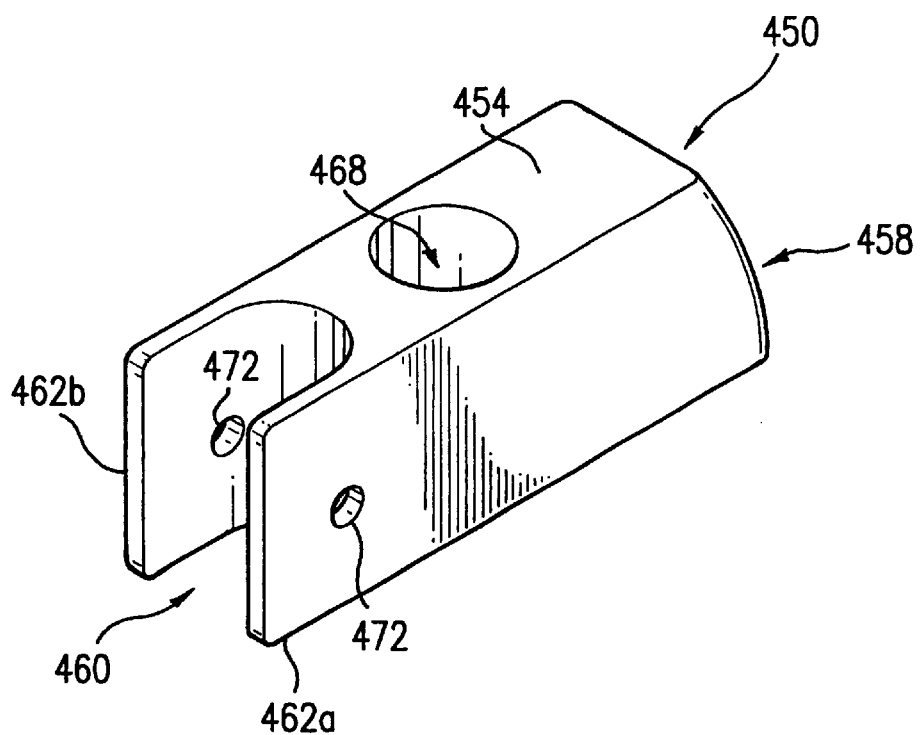
FIGS. 6A and 6B are isometric views of the latch mount of the stroller latch of FIG. 3.
Figure 6B:
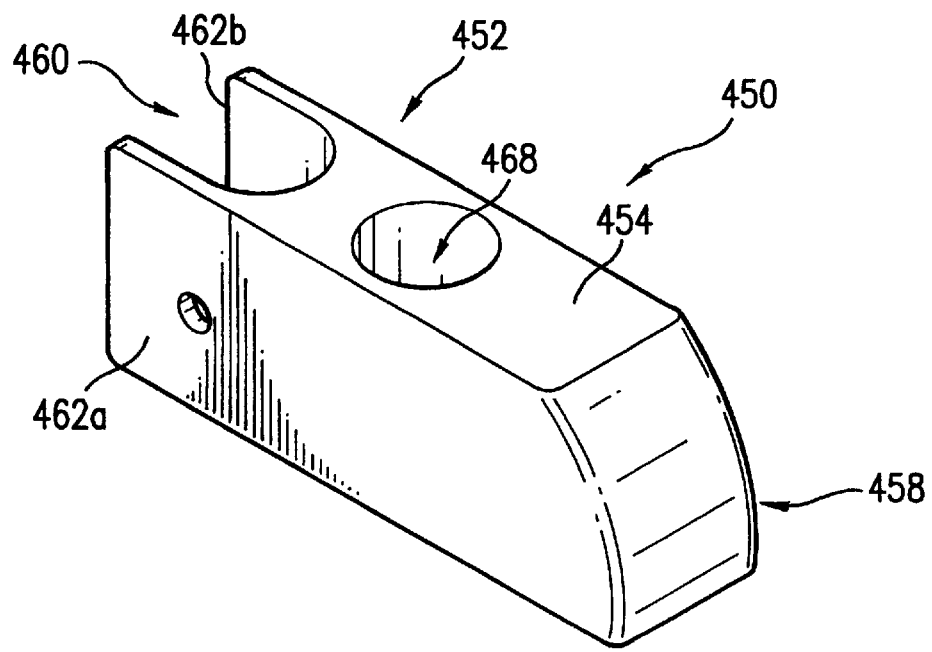

Referring to FIGS. 3, 6a and 6b, latch mount 450 includes a forward end 458 and a rearward end 460 defined by a pair of rearwardly extending left and right walls 462a, 462b. A hole 468 extends from top to bottom through latch mount 450 and receives upper end 336 of front leg 330a, FIG. 3. Upper end 336 is extended through hole 468 such that top portion 337 extends out beyond a top end 452 of latch mount 450, thereby allowing top portion 337 to be received in locking sleeve 438, as discussed above. Upper end 336 is fixed in hole 468 by any conventional means known in the art, e.g., riveting upper end 336 to latch mount 450. Top end 452 of latch mount 450 defines a mating surface 454 which mates with collar mating surface 418 when top portion 337 of front leg 330a is inserted into locking sleeve 438. Terminal end 308a of handle 302 is pivotally coupled to latch mount 450 at rearward end 460 by passing a pivot pin 316 through terminal end 308a of handle 302 with the ends of pivot pin 316 being supported in left and right bearing holes 472 formed in the respective left and right walls 462a, 462b of latch mount 450. Rearward end 460 is formed with an exposed end so as to allow handle 302 to rotate approximately 180 degrees when stroller frame 300 is configured between deployed and folded positions, as can be seen by comparing FIG. 3 with FIG. 7d.

Figure 5:
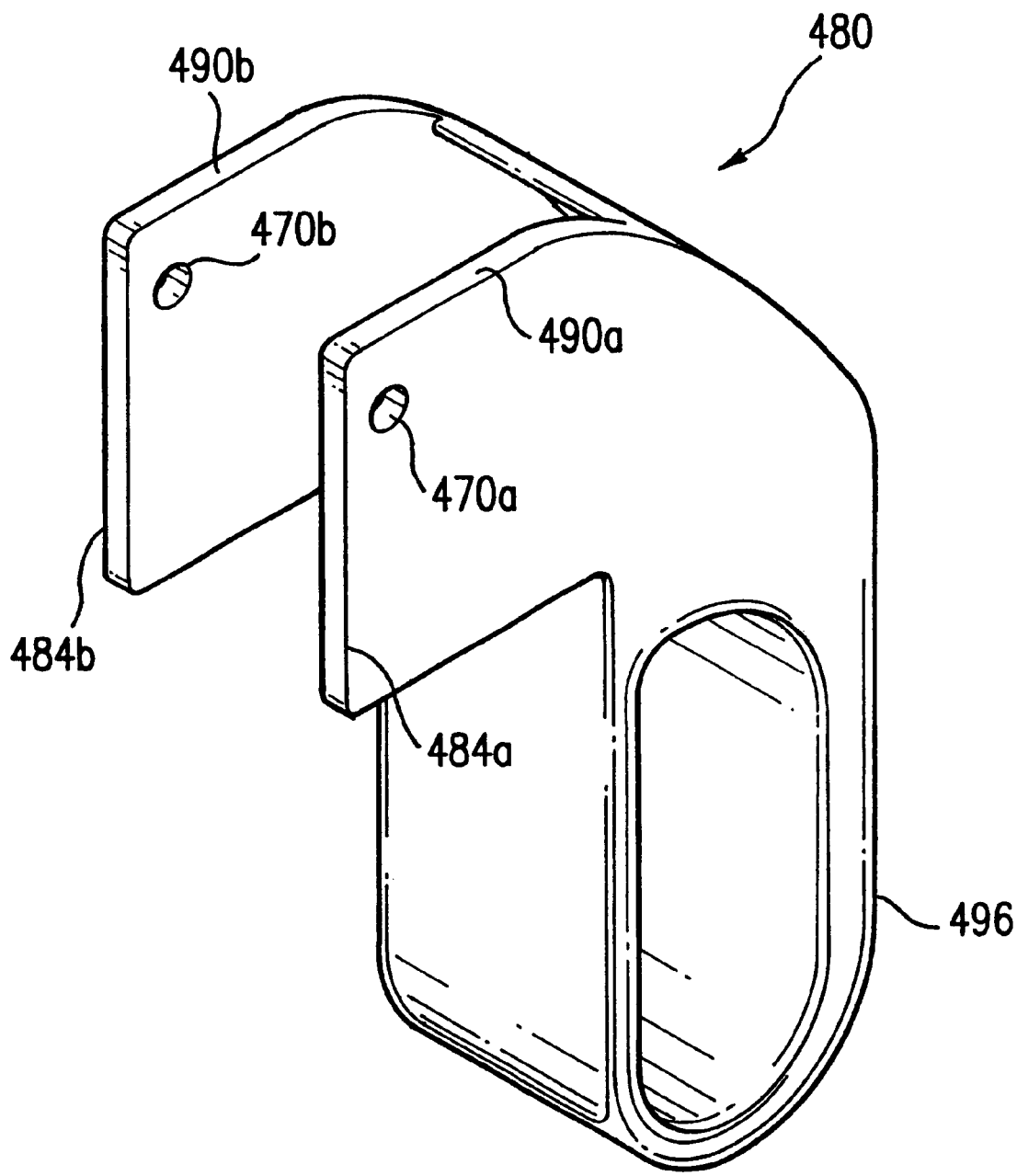
FIG. 5 is an isometric view of the handle of the stroller latch of FIG. 2.

Referring to FIGS. 3 and 5, latch handle 480 includes a pair of left and right arms 484a, 484b, a hand grip 496 extending downward at a right angle from a proximal end of arms 484a, 484b with the distal ends of arms 484a, 484b extending over the right and left sides of latch mount 450 forward end 458. Left and right latch handle pivot holes 470a, 470b are formed at the distal ends of arms 484a, 484b. Latch handle 480 is pivotally coupled to latch mount 450 by inserting a pivot pin (not shown) through latch mount with the ends of the pivot pin being supported in pivot holes 470a, 470b. As shown in FIG. 3, latch handle 480 rests with hand grip 496 extending downwardly from latch mount 450, lying adjacent to and parallel with front leg 330a so that a user may conveniently operate latch 400a from a rearward facing position (i.e., adjacent to front legs 330 and facing seating area 380) to facilitate folding of stroller frame 300, as discussed below. The upper surfaces of left and right arms 484a, 484b define the previously mentioned left and right second engaging surfaces 490a, 490b for latch handle 480 which engage first engaging surfaces 432a, 432b of collar 410 when latch handle 480 is pivoted about pivot 470.

Latch Operation and Stroller Fold

Figure 7A:
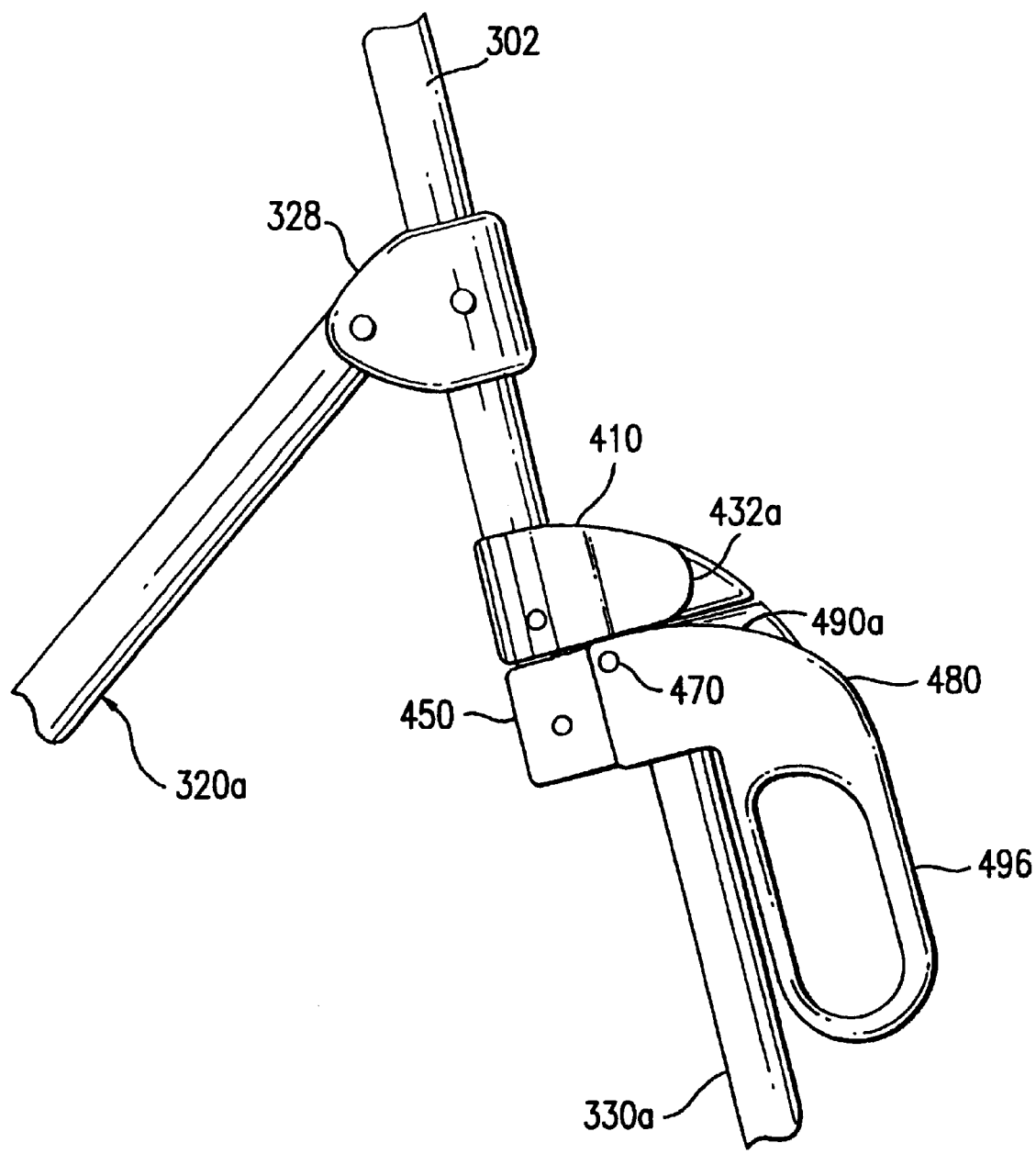
FIGS. 7A, 7B, 7C and 7D are side views of the stroller latch of FIG. 3 as the stroller frame of FIG. 2 is configured between a deployed and folded position.
Figure 7B:
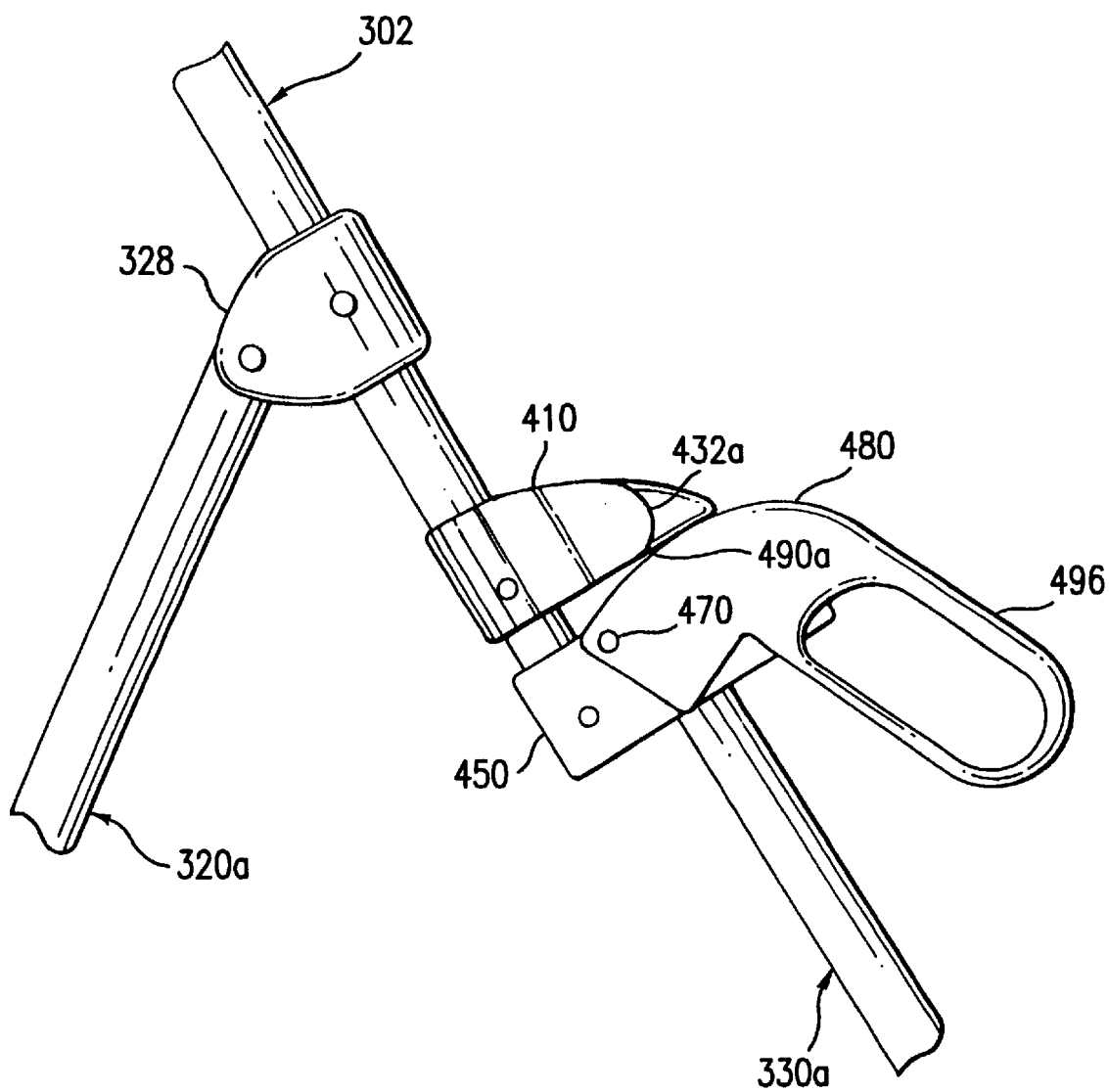

The operation of latches 400a, 400b and folding sequence for stroller frame 300 will now be described in detail by reference to the operation of left latch 400a and corresponding folding sequence for left front leg 330a, left rear leg 320a and left terminal end 308a of stroller handle 302 with the understanding that the same description applies to right latch 400b, right rear leg 320b, right front leg 330b and right terminal end 308b. Referring to FIG. 7a, stroller frame 300 is locked in a deployed position when locking sleeve 438 is inserted over top portion 337 of front leg 330a such that front leg 330a and terminal end 308b of stroller handle 302 are secured in a fixed parallel relation. Referring to FIG. 7b, disengagement of latch 400a is initiated by pulling up on hand grip 496 to cause latch handle 480 to pivot upwardly and thereby bring first engagement surfaces 432a and 432b of collar 410 into engagement with second engagement surfaces 490a and 490b, respectively, of latch handle 480. Preferably, collar 410 includes both a right and left first engagement surface 432a, 432b for engaging left and right second engagement surfaces 490a, 490b of latch handle 480. However, both a right and left pair of engagement surfaces are not necessary. Latch handle 480 may include only a left (or right) second engagement surface 490 for engagement with a corresponding left (or right) first engagement surface 432 of collar 410 without departing from the scope of the invention.

The detailed description of first and second engagement surfaces 432 and 490, respectively, follows by reference in detail to left engagement surfaces 432a, 490a with the understanding that the same description applies to right engagement surfaces 432b and 490b.

Figure 7C:
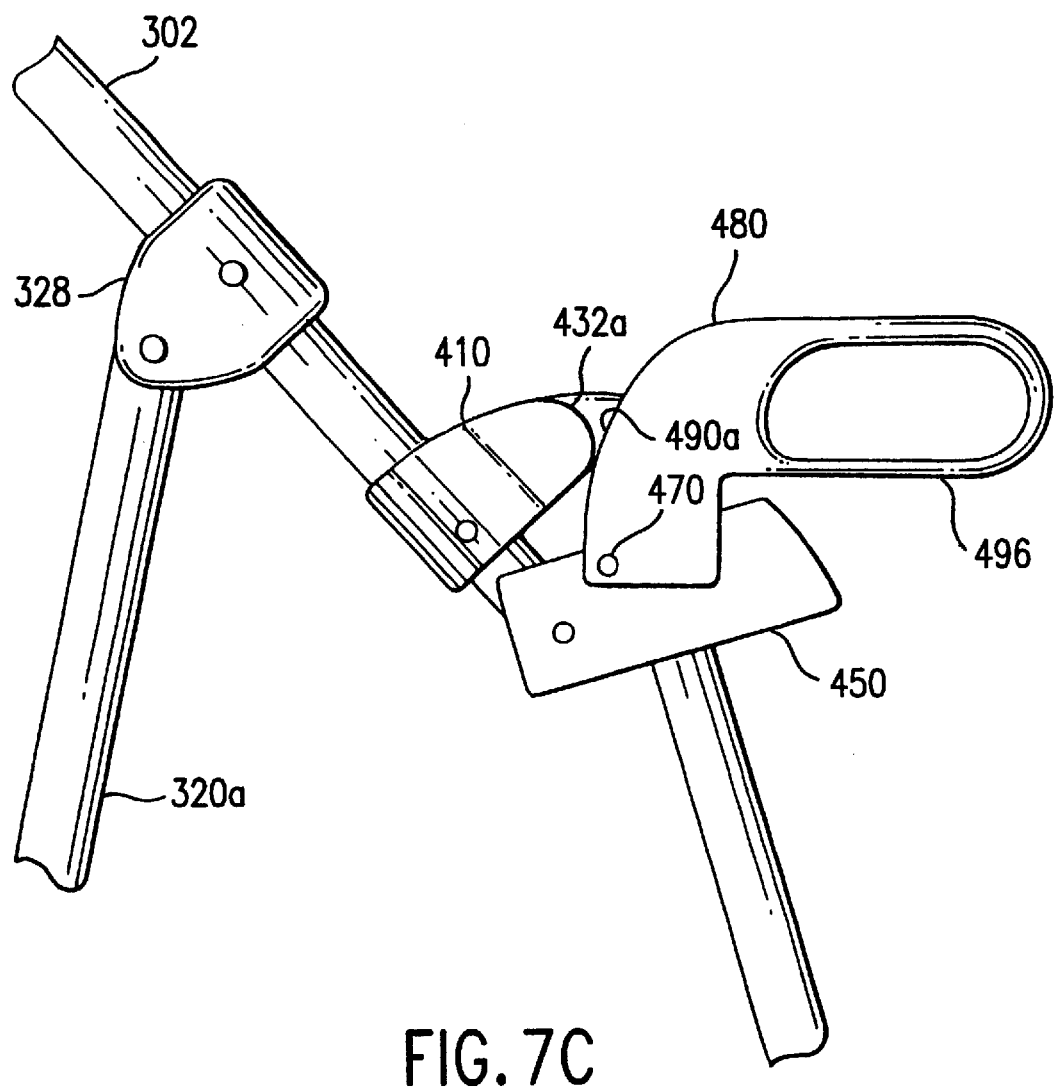
Figure 7D:
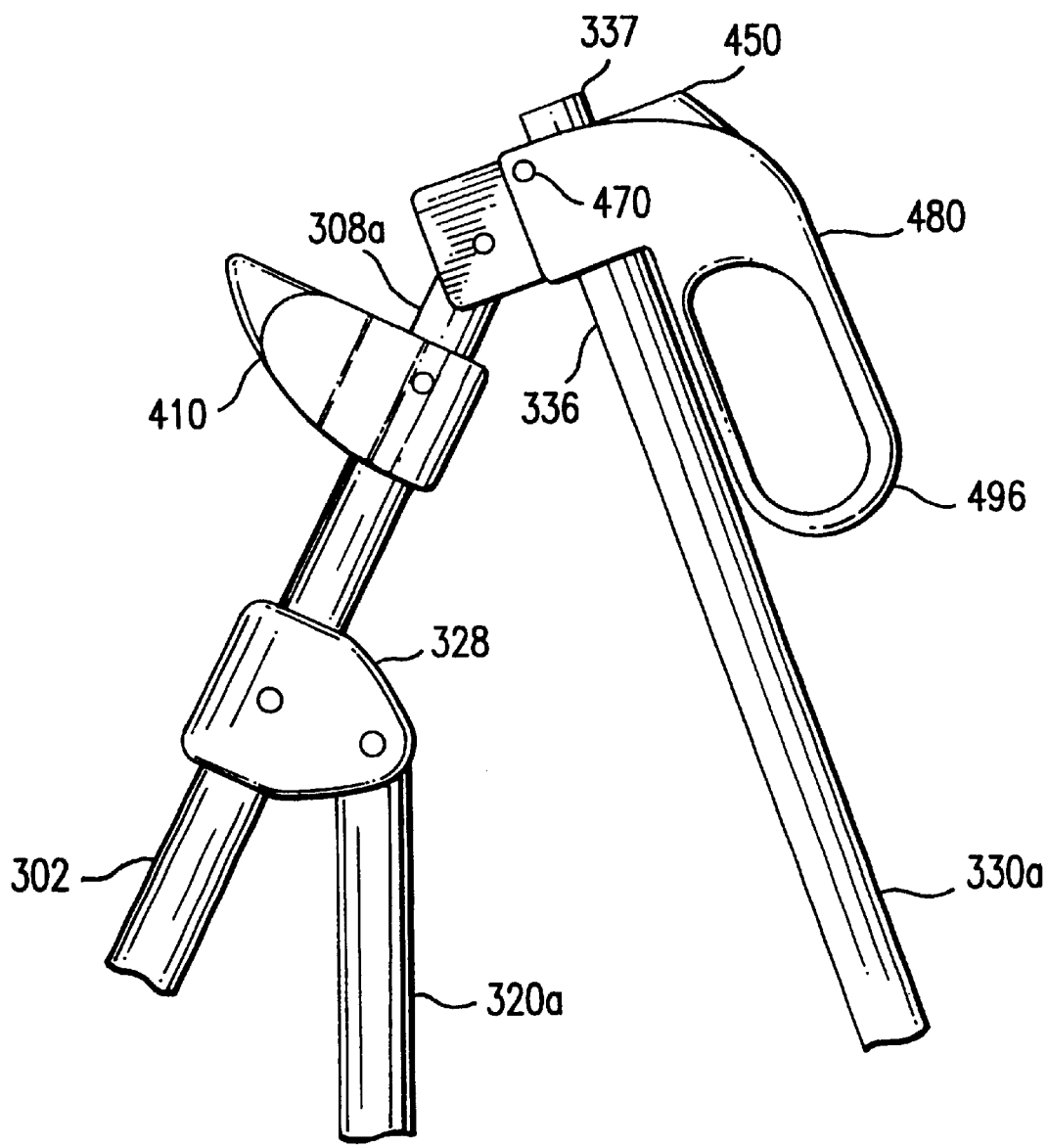

As mentioned earlier, first engagement surface 432a and second engagement surface 490a are brought into contact when stroller frame 300 is to be configured from the deployed to the folded position. As can be seen in FIGS. 7a–7d, second engagement surface 490a and first engagement surface 432a describe a pair of curved surfaces disposed adjacent to each other. First engagement surface 432a and second engagement surface 490a are provided for the purpose of translating pivotal motion of latch handle 480 into upward motion of collar 410 by rolling surface contact between surfaces 432a, 490a as latch handle 480 is pivoted about pivot 470, as best shown in FIGS. 7b and 7c. Thus, the mechanism described by the interaction between collar 410 and latch handle 480 may be thought of as a cam. The upward motion referred to corresponds to the direction of travel of collar 410, which is parallel to the longitudinal axis of stroller handle 302 at lower end 308a. First engagement surface 432a and second engagement surface 490a are preferably formed to approximate an arc of a circle, although the invention is not limited to this embodiment. The preferred embodiment uses a pair of opposing surfaces approximating arcs of a circle since it was found that this particular pair of cooperating surfaces is effective in causing second engagement surface 490a to impart a force to collar 410 that is roughly parallel to the longitudinal axis of stroller handle 302 throughout the range of angular motion of latch handle 480 as it is pivoted about pivot 470. It is contemplated that other cooperating pairs of engagement surfaces will also be effective in translating pivotal motion of latch handle 480 into upward motion of collar 410 without departing from the scope of the invention and that the particular shape of surfaces 432a, 490a may be modified to suit particular needs. Referring to FIGS. 7b, 7c and 7d, the force imparting upward motion to collar 410 causes locking sleeve 438 to be pushed away from top portion 337 of front leg 330a. Once locking sleeve 438 has been displaced a sufficient amount along its direction of travel by latch handle 480, locking sleeve 438 clears top portion 330a, thereby disengaging stroller latch 400a. Stroller handle 302 may then pivot about rear leg 320 to configure stroller frame 300 in a folded position. Once stroller handle 302 has begun to fold over rear leg 320, stroller handle 302 will then naturally continue to rotate about rear leg 320 until stroller handle 302 is in the folded position, FIG. 7d.

When locking sleeve 438 is clear of top portion 330a, stroller handle 302 can then begin to rotate in the stroller folding direction. That is, stroller handle 302 rotates about rear leg hinge 328 and over rear leg 320a so as to bring upper end 304 of stroller handle 302 into an adjacent relation with lower end 322 of rear leg 320a, thereby configuring stroller frame 300 in the folded position. Thus, in the folded position, rear leg 320a is positioned between stroller handle 302 and front leg 330a, as illustrated in FIG. 7d. As can be seen by inspection of FIGS. 7b–7d, the rotation directions for latch handle 490 and stroller handle 302 are both counterclockwise. This feature is desirable since it provides a convenient means for folding stroller frame 300 since stroller frame 300 will fold in the same direction as the user is pivoting latch handle 480. Thus, stroller frame 300 is configurable from a deployed position where stroller handle 302 and front legs 330a and 330b are locked in a parallel relation to a completely folded position by positioning oneself in the rearward facing direction (i.e., adjacent to front leg 330a and facing seating area 380), grasping hand grips 496 of left and right latches 400a, 400b and pivoting latch handles 480a, 480b upwards. To configure stroller frame in the deployed position (FIG. 2), stroller handle 302 is rotated clockwise in FIG. 7d. As stroller handle 302 rotates, each of the top portions 337 of front legs 330a, 330b engage with mating surfaces 418 of collars 410 and ride along mating surfaces 418 until top portions 337 are forced into locking sleeves 438 by action of springs 314 biasing mating surfaces 418 of collars 410 into mating engagement with the corresponding mating surfaces 454 of latch mounts 450. Thus, left and right latches 400a, 400b are self-locking as stroller handle 302 is rotated into a parallel relationship with front legs 330a and 330b.

Other embodiments of latch 400 are contemplated. For example, latch handles 480 of left and right latches 400a and 400b may be integrally formed with a tray or grab bar extending across seating area 380. Thus, latch handles 480 may be configured to function as both a support for a tray or grab bar and as a stroller folding handle.

Bolster

Figure 8:
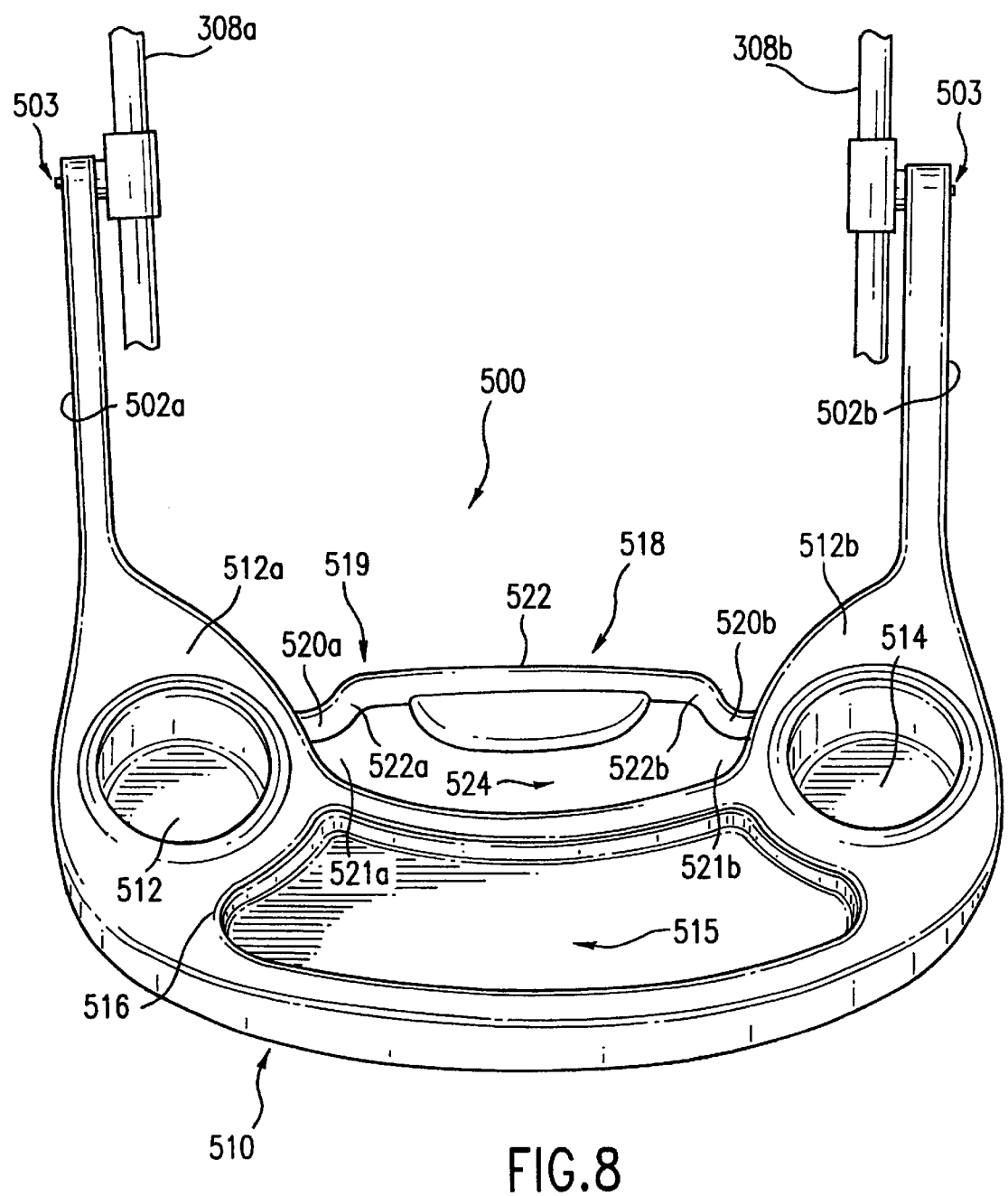
FIG. 8 is a front view of the bolster of the stroller of FIG. 2.

Reference will now be made in detail to bolster 500 and infant carrier 30. Referring to FIGS. 1, 2, and 8, bolster 500 is generally U-shaped having an activity area 510, left and right arms 502a, 502b each having a terminal end 503 pivotally coupled to stroller handle 302 at an intermediate end 318 thereof, a pair of left and right bolster supports 506a, 506b for supporting bolster 500 on top surface 414 of collar 410 when bolster 500 is positioned to extend across seating area 380, as shown in FIG. 1, and a mounting section 518 for mounting infant carrier 30 on bolster 500, as illustrated in FIG. 10. The pivotal coupling between terminal end 503 and stroller handle 302 may be accomplished by any well known means in the art. Bolster arms 502a, 502b, and activity area 510 are preferably constructed as a one-piece molded plastic body, As mentioned earlier, bolster 500 is positionable adjacent upper end 304 of handle 302 when not in use and can be easily rotated to extend across seating area 380 for a child passenger. By providing a pivoting bolster 500, a parent can easily remove or place a child in seating area 380, attend to a child's needs without being obstructed by a center bar or tray and allow a child to climb in and out of the stroller seat without being obstructed by activity area 510. Moreover, when a parent does not wish to place activity area 510 across seating area 510, bolster 500 can simply be stowed at upper end 304, rather than having to completely remove bolster 500 from stroller frame 300. The U-shape of bolster 500 and the pivot locations for arms 502a, 502b allows a user to pivot bolster 500 between a stowed and use position (i.e., extending across seating area 380) while children of varying seating heights are seated in the stroller.

Referring to FIG. 8, activity area 510 includes left and right end portions 512a, 512b and a center portion 515 extending forwardly and between end portions 512a and 512b. Formed on a top surface 509 of activity area 510 are left and right cup holders 514 and a tray 516. Mounting section 518 is defined by a generally U-shaped member 519 extending between left and right end portions 512a, 512b and an open area 524 formed by U-shaped member 519 and the rearward end of center portion 515. U-shaped member 519 includes left and right ends 520a and 520b, respectively, and an upwardly extending center portion 522 having left and right upstanding walls 522a, 522b adjacent to left and right ends 520a, 520b. Left and right ends 520a, 520b, the adjacent clearance 521a, 521b and upwardly extending walls 522a, 522b define a latch mount for receiving infant carrier 30, as will now be described in greater detail.

Infant Carrier Mounting to Stroller

Figure 9A:
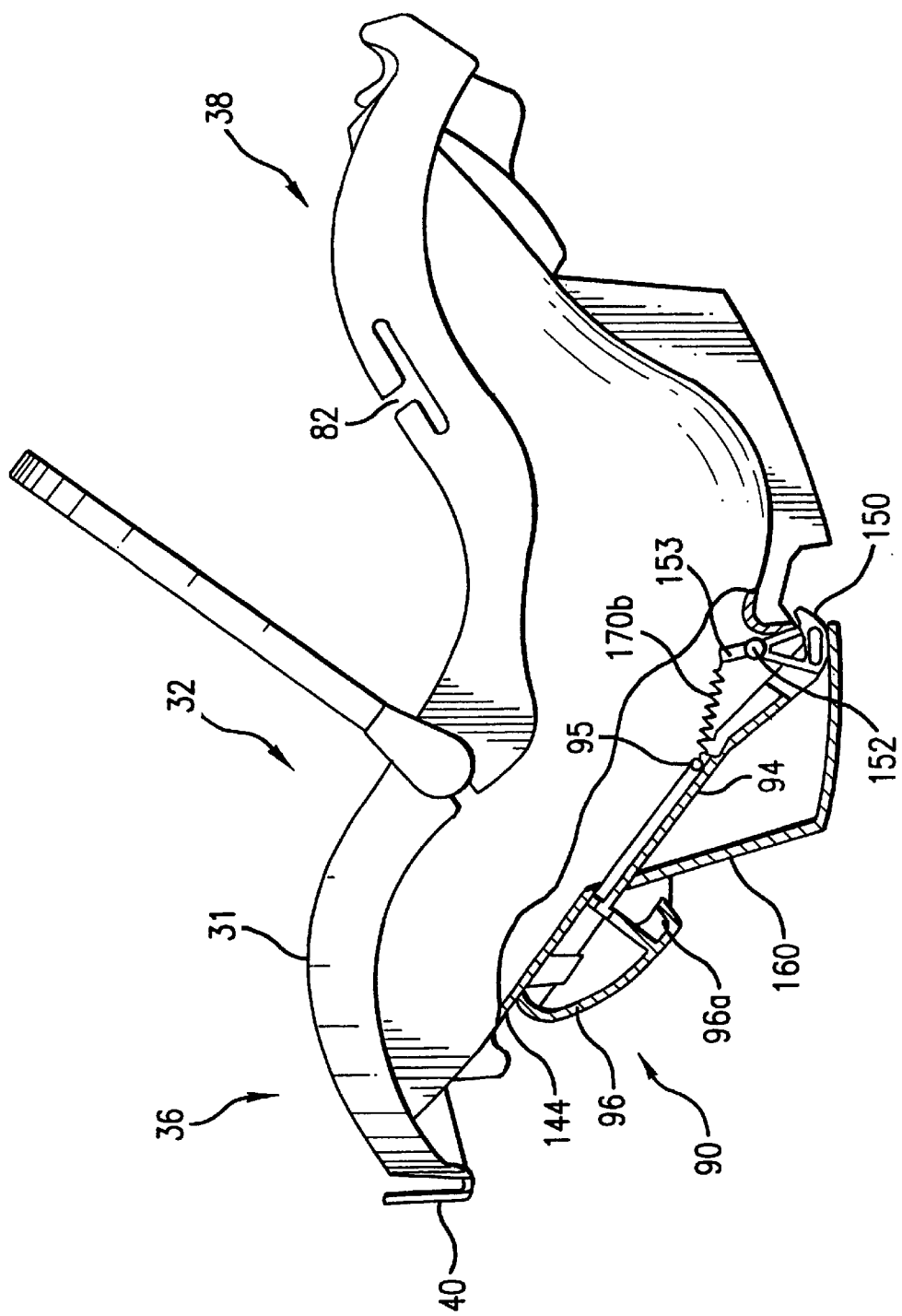
FIG. 9A is a side view of an infant carrier.
Figure 9B:
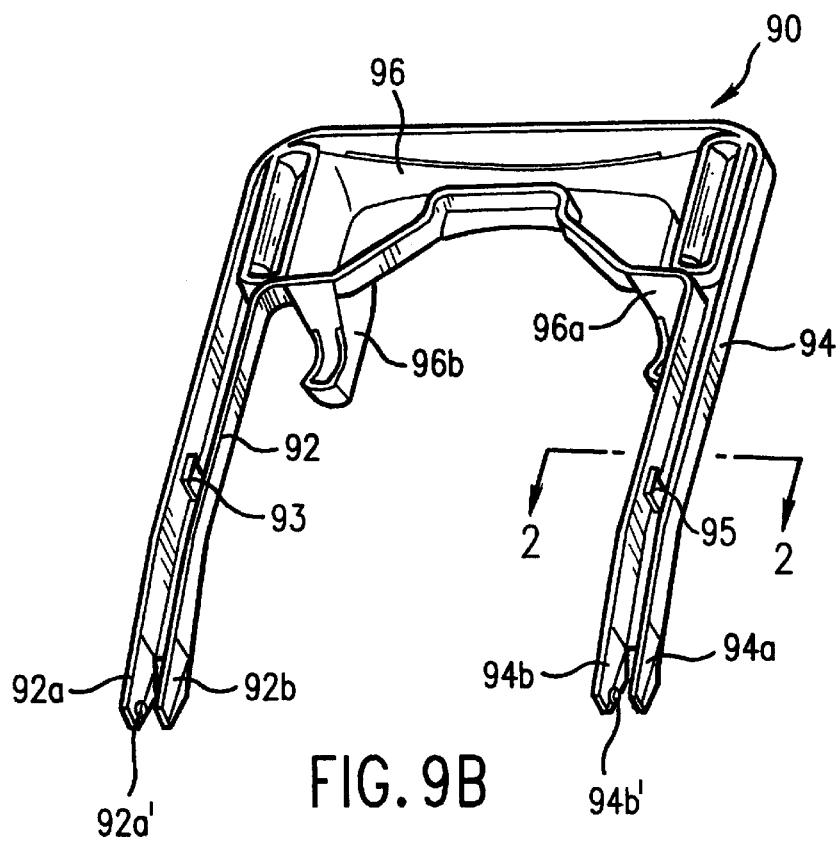
FIGS. 9B and 9C are isometric views of a portion of the infant carrier of FIG. 9A.
Figure 9C:
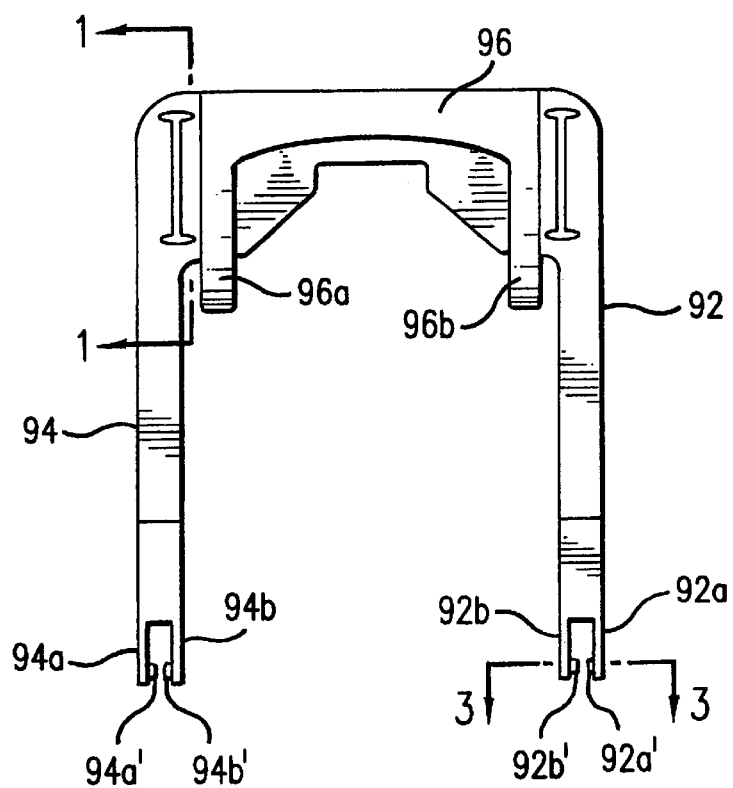

In the preferred embodiment, mounting section 518 is adapted for mounting infant carrier 30 (or alternatively, car seat 30). Infant carrier 30 is described in greater detail in the Assignee's co-pending application Ser. No. 09/422,067, filed Oct. 21, 1999, entitled "Stay in View Car Seat", herein incorporated by reference in its entirety. Referring to FIG. 9a, infant carrier 30 is formed from a molded shell 31 having a substantially L-shaped configuration. Infant carrier includes a seating side 32 defining a head supporting end 36 and feet supporting end 38 for supporting, respectively, the head and feet of a child placed in infant carrier 30. Mounted on a bottom surface 144 at head supporting end 36 is a release handle 90 adapted for engagement with mounting section 518 of bolster 500. Referring to FIGS. 9b and 9c release handle 90 includes a grasping portion 96 connecting spaced parallel arms 92, 94 and a pair of left and right hook portions 96a, 96b. Grasping portion 96 slides along the bottom surface 144 of channels formed in shell 31 (not shown). Springs 170a, 170b are secured at one end to arms 92, 94 at locations 93, 95, respectively and at their opposite ends to a second latching hook 150 of the infant carrier 30 that is pivotally mounted to shell 31. FIG. 9a illustrates the attachment of right spring 170b to arm 94 at location 95 (left spring 170a is secured in a similar fashion). Springs 170a, 170b bias hooks 96a, 96b in a locked position to provide self-engagement of hooks 96a, 96b with left and right ends 520a, 520b of U-shaped mounting member 519 as infant carrier 30 is mounted to bolster 500. To mount infant carrier 30 to bolster 500 mounting section 518, infant carrier is positioned with head supporting end 36 positioned over mounting section 518 and inserted downward so that hooks 96a, 96b slide into the respective left and right clearances 521a, 521b and snap into locking engagement with left and right mounting ends 521a, 521b of U-shaped member 519. When secured in mounting section 518, infant carrier 30 is supported by bolster 500 at head supporting end 36 and by seat 384 of seating area 380 at feet supporting end 38.

What is claimed is:

1. A stroller latch for selectively configuring a stroller frame between a folded position and an unfolded position, the stroller frame including a stroller handle having a lower end and an upper end, front leg having an upper end and a rear leg hingedly coupled to the stroller handle through a rear leg hinge, said stroller latch comprising:

a latch mount adapted to be pivotally mounted to the lower end of the stroller handle and for fixedly mounting to the upper end of the front leg;

a collar adapted to be slidably coupled to the stroller handle, said collar including a locking sleeve adapted to be releasably engageable over the upper end of the front leg to lock the front leg and stroller handle in the unfolded position of the stroller frame; and a latch handle pivotally coupled to the latch mount and for operatively releasing the locking sleeve from the upper end of the front leg and configuring the stroller frame in the folded position by pivoting said latch handle into mating engagement with said collar.

2. The stroller latch of claim 1, said collar further including a first engagement surface and said latch handle including a second engagement surface disposed in operative proximity to said first engagement surface, wherein said mating engagement of said latch handle with said collar corresponds to a rolling surface contact between said second engagement surface and said first engagement surface as said latch pivots into mating engagement with said collar.

3. The stroller latch of claim 2, wherein said rolling surface contact between said second engagement surface and said first engagement surface imparts an upward motion to said collar for releasing said locking sleeve from the upper end of the front leg.

4. The stroller latch of claim 3, wherein said first engagement surface and said second engagement surface each describe a surface approximating an arc of a circle.

5. The stroller latch of claim 2, wherein said collar further includes a third engagement surface identical to and disposed opposite from said first engagement surface and said latch handle further includes a fourth engagement surface identical to and disposed opposite from said second engagement surface, wherein said mating engagement of said latch handle with said collar corresponds to a rolling surface contact between said first and second engagement surfaces and said third and fourth engagement surfaces as said latch handle pivots into mating engagement with said collar.

6. The stroller latch of claim 1, wherein the pivoting of said latch handle into mating engagement with said collar imparts upward motion to said collar for releasing said locking sleeve from the upper end of the front leg so as to permit said stroller handle to rotate about the rear leg hinge.

7. The stroller latch of claim 6, wherein a first surface defined by a portion of said collar is matingly engageable with an opposing second surface defined by a portion of said latch handle to define a cam for imparting said upward motion to said collar.

8. The stroller latch of claim 1, wherein said latch handle further comprises:
   a first, proximal end defining a pivot point for said latch handle and a second, distal end forming a hand grip extending downwardly, wherein movement of the hand grip pivots said latch handle into mating engagement with said collar and positions the stroller frame in the folded position.

9. The stroller latch of claim 1, wherein a biasing spring is coupled at a first end to said collar and is adapted to be coupled to the stroller handle at a second end so as to cause said locking sleeve to be spring biased into engagement with the upper end of the front leg.

10. A stroller frame being configurable between a deployed and folded position, said stroller frame comprising:
   a stroller handle having a lower end defining a longitudinal axis for the stroller handle, an upper end and an intermediate portion hingedly coupled to a rear leg through a rear leg hinge and a front leg having an upper end hingedly coupled to the lower end of the stroller handle through a front leg hinge, the front leg hinge and rear leg hinge defining an axis of rotation for the stroller handle about the front and rear legs, wherein said stroller handle is rotatable in a stroller folding direction to configure the stroller frame in the folded position, said stroller folding direction characterized by a rearward and downward displacement of the stroller handle upper end such that when said stroller frame is in the folded position, the rear leg is disposed between said stroller handle and the front leg;
   a first latch member slidable along a direction of travel parallel to the stroller handle longitudinal axis, said first latch member including a locking sleeve received over the upper end of the front leg for locking said stroller frame in the deployed position; and
   a second latch member pivotally coupled to the front leg hinge for pivotal motion about said axis of rotation, wherein the second latch member is pivotable in the stroller folding direction to configure said stroller frame from the deployed to the folded position.

11. The stroller frame of claim 10, wherein said pivoting of said second latch member in the stroller folding direction causes said first latch member to be displaced along the direction of travel so as to remove said locking sleeve from the upper end of the front leg.

12. The stroller frame of claim 11, said first latch member further including a first engaging surface and said second latch member including a second engaging surface disposed adjacent to said first engaging surface, wherein said second latch member is pivotable in the stroller folding direction to permit said second engaging surface to be matingly engageable with said first engaging surface through rolling surface contact of said second engaging surface along said first engaging surface so as to cause said first latch member to be displaced along the direction of travel.

13. The stroller frame of claim 12, wherein said first engaging surface and said second engaging surface define a pair of engagement surfaces for a cam.

14. The stroller frame of claim 11, wherein said second latch member includes:
   a first, proximal end defining a pivot point for said latch handle and a second, distal end forming a user handle extending downwardly so as to enable the stroller frame to be folded by lifting the stroller frame by said user handle, thereby pivoting said second latch member in the stroller folding direction.

15. The stroller frame of claim 14, wherein said second latch member takes the shape of an inverted L-shaped body and said first proximal end corresponds to a pair of forwardly extending arms having a first end and second end, wherein said pivot point is located at said first end and said downwardly extending user handle is integrally formed with said second end.

16. A stroller latch for selectively configuring a stroller frame between a folded and unfolded position, the stroller frame including a stroller handle having a lower end, front leg having an upper end and a rear leg hingedly coupled to the stroller handle through a rear leg hinge, said stroller latch comprising:
   a latch mount adapted to be pivotally mounted to the lower end of the stroller handle and fixedly mounted to the upper end of the front leg;
   a locking member adapted to be coupled to the stroller handle, said locking member being releasably engageable with the upper end of the front leg to configure the stroller frame in the unfolded position;
   an engaging surface formed on said locking member; and
   a cam defining a camming surface disposed in operative proximity to said engaging surface, said cam being pivotally coupled to the latch mount and operable for configuring the stroller in the folded position by pivoting said camming surface into mating engagement with said engaging surface.

17. The stroller frame of claim 16, wherein said engaging surface and said camming surface describe an opposed pair of arcuate surfaces.

18. A stroller, comprising:
   a stroller frame configurable between a folded and deployed position, said stroller frame including a U-shaped stroller handle having an upper end, left and right terminal ends and left and right intermediate portions;
   a stroller seating area disposed between said left and right stroller handle terminal and intermediate portions;
   a stroller bolster having left and right terminal ends pivotally coupled to said stroller handle at the left and right intermediate portions thereof and a center section positionable between a first position wherein said center section is positioned across said seating area and a second position wherein said center section is positioned adjacent said stroller handle upper end, said center section including:
      a child activity area including left and right end portions and a center portion extending between and forward of said left and right end portions;

a child carrier mount for mounting a child carrier, said child carrier mount including left and right mounting members disposed rearward of said center portion and extending inward from the respective said left and right end portions, said left and right mounting members being adapted for receiving corresponding latching hooks of a child carrier.

19. The stroller of claim 18 in combination with a child carrier, said child carrier comprising:

a child carrier shell having a child seating surface and a rear surface opposite from said child seating surface;

a latch mounted to the rear surface of said child carrier shell, said latch including a pair of left and right hook members formed at opposite ends of said latch, wherein said child carrier is releasably secured to said stroller by engaging said left and right hook members with the respective said left and right mounting members.

20. The combination stroller and child carrier of claim 19, said stroller frame further comprising:

a rear leg member having an upper end pivotally coupled to said stroller handle at said stroller handle intermediate portions;

a pair of front legs each having respective left and right upper ends; and left and right stroller latches pivotally coupling the respective left and right upper ends of said front legs to the respective left and right terminal ends of said stroller handle, said stroller latch being operative for locking said front legs and said stroller handle in the deployed position.

21. The combination stroller and child carrier of claim 19, wherein said child carrier latch further includes a handle integrally formed with and extending between said left and right hooks.

22. The stroller of claim 18, wherein said child carrier mount is formed integrally with said center section and defines a U-shaped member extending between said left and right end portions.

23. The stroller of claim 18, wherein said stroller handle is rotatable about a first rotation axis to configure said stroller frame between a folded and deployed position and wherein said bolster is pivotable about said first rotation axis to pivot said bolster center section between said first position and said second position.

* * * * *